United States Patent [19]
Alcock et al.

[11] 3,971,027
[45] July 20, 1976

[54] RADIO INTERFEROMETER SECTOR-DEFINITION

[75] Inventors: Robert Nicholas Alcock, Reigate; Richard Paul Vincent, Crawley; Stephen Joseph Robinson, South Godstone, all of England

[73] Assignee: U.S. Philips Corporation, New York, N.Y.

[22] Filed: Nov. 13, 1974

[21] Appl. No.: 523,328

[30] Foreign Application Priority Data
Nov. 21, 1973  United Kingdom............... 53983/73

[52] U.S. Cl. ............................. 343/113 R; 343/114
[51] Int. Cl.² .......................................... G01S 3/48
[58] Field of Search ........................ 343/113 R, 114

[56] References Cited
UNITED STATES PATENTS

| | | | |
|---|---|---|---|
| 3,406,397 | 10/1968 | Easton et al. ................... | 343/113 R |
| 3,742,505 | 6/1973 | Rocke .............................. | 343/113 R |
| 3,803,612 | 4/1974 | Alcock et al..................... | 343/113 R |
| 3,889,267 | 6/1975 | Lucas et al...................... | 343/113 R |

*Primary Examiner*—Maynard R. Wilbur
*Assistant Examiner*—Richard E. Berger
*Attorney, Agent, or Firm*—Frank R. Trifari; George B. Berka

[57] ABSTRACT

A vertical radio-interferometer sector-definition system, using an array of aerial elements which are arranged in a vertical straight line and are symmetrically disposed about the center of the array, which is unaffected by ground-reflected indirect-path signals.

If $\theta$ is the angle of arrival, by a direct path, of a signal and $p$ is the ground reflection coefficient, then from a symmetrical pair of aerial elements is derived a product of two functions $f_1(\theta).f(p)$ and from another symmetrical pair is derived another product $f_2(\theta).f(p)$: division of one product by the other "cancels out" $f(p)$ to provide a quotient signal which is a function of $\theta$ but not of $p$. Either or both product functions may be derived with or without the aid of a central element.

4 Claims, 13 Drawing Figures

RADIO INTERFEROMETER SECTOR-DEFINITION

The invention relates to a radio interferometry method of defining, at a ground location, an angular sector in the vertical plane and of indicating if a distant radio source, particularly one in an aircraft in the course of landing, falls within that sector, and to a system for carrying out that method.

A need arises in aircraft-landing systems using radio interferometer receivers for defining whether an airborne transmission lies above or below a defined elevation angle in space, that is to say to define a vertical sector within which the distant source of transmission lies. This knowledge enables the coverage of the aerial array of a vertical interferometer to be extended and a typical example of such sector definition is to be found in U.K. Patent Specification 1,337,099.

There is however a very significant problem in that whilst simple interferometers or amplitude comparison systems can be used for defining angular sectors they are apt to become unreliable at low elevation angles, for example below about 3°, where the ground reflection coefficient approaches unity and the use of directive aerial elements in the interferometer to provide polar diagram protection and thereby to discriminate against reflected signals becomes inadequate.

It is an object of the invention to provide a method of defining a vertical sector in which the influence of the ground reflection coefficient $p$ is eliminated. It is a further object of the invention to provide a system for carrying out this method.

The method according to the invention of defining a vertical sector by means of radio interferometry in which from each aerial of an array of at least three aerials arranged in a vertical straight line an information signal is derived which depends both on the elevation angle $\theta$ at which a radio wave from a distant source is incident upon the array and on the ground reflection coefficient $p$, is characterized in that from the information signals from a first group of aerials which comprises at least two aerials of the said array and from the information signals from a second group of aerials symmetrically disposed relative to the centre point of the first group and comprises at least one aerial of the said array a first and a second auxiliary signal respectively are derived, the amplitude of which is proportional to a function $f(p)$ of $p$, which is equal for both groups of aerials, multiplied by a function $f_1\theta$ and $f_2(\theta)$ respectively, which is different for the two groups of aerials and depends upon $\theta$ and not upon $p$, and in that the modulus of one auxiliary signal is divided by the modulus of the other auxiliary signal to produce a quotient signal which is dependent upon $\theta$ but is independent of $p$.

According to the invention also, a system for defining a vertical sector by means of radiointerferometry, which system is suitable for carrying out a method as defined above, comprises an array of at least three aerials arranged in a vertical straight line, radio receiver means to obtain from each aerial an information signal which contains information about both the amplitude and the phase of the received signal and is a function of the elevation angle $\theta$ and of the ground reflection coefficient $p$, first means for forming a linear vector combination of two or more information signals obtained from a first group of aerials which comprises at least two aerials of the said array to provide a first auxiliary signal, second means to derive from information signals obtained from a second group of aerials which is symmetrically disposed relative to the centre point of the first group and comprises at least one aerial of the said array a second auxiliary signal, and means to divide one auxiliary signal by the other to provide a quotient signal which is a function of $\theta$ but is independent of $p$.

Embodiments of the invention will now be described, by way of example, with reference to the accompanying diagrammatic drawings in which.

Figure 1:
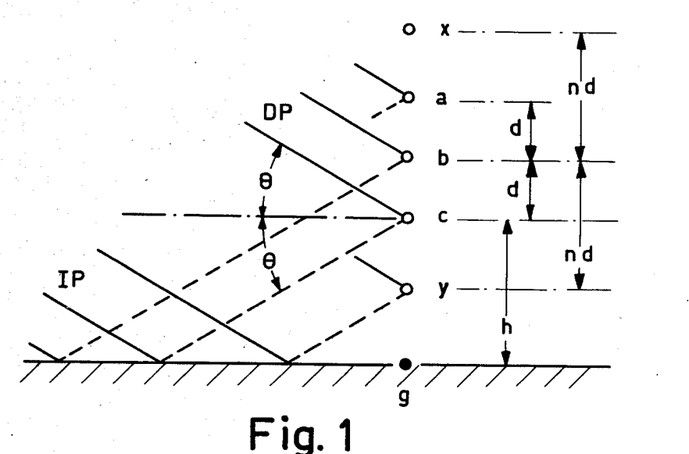
FIG. 1 illustrates an array of aerials arranged in a vertical straight line.

Referring now to FIG. 1 this illustrates a vertical linear aerial array of elements $x, a, b, c$ and $y$ positioned above a point $g$ on the surface of the ground and having the element $b$ in the centre of the array; evenly spaced about the element $b$, each by a distance $d$, are two elements $a$ and $c$; similarly, equally spaced about the element $b$ the distances $nd$ are the elements $x$ and $y$: the vertical height between the point $g$ and the element $c$ is indicted at $h$.

Upon this aerial array is incident the radio wave from a distant source such as an aircraft: this wave arrives at each aerial element by two paths, a direct path indicated in FIG. 1 by DP and an indirect path involving reflection from the ground in front of the array and indicated in FIG. 1 by IP. At each element therefore the received signal comprises a direct signal received at an elevation angle $\theta$ along a path DP and a reflected signal, indicated in broken lines in FIG. 1, received at an elevation angle $-\theta$ along a path IP including a reflection from the ground.

It is convenient here to make various assumptions which although not necessarily absolutely correct have in practice been found to be so nearly so as to have no significant effect upon the practical operation of the system. These assumptions are that the aerial array is positioned above ground which is smooth, level and has a constant reflection coefficient $p$ so that at each aerial element the direct signal can be regarded as having the value unity whilst the reflected signal has the value $p$. In order to simplify the mathematics the phase change of 180°, that is to say $\pi$ radians, which results when vertically-polarised signals are reflected is taken account of by allowing $p$ to be negative. Further, in accordance with normal practice all phases and other angles are expressed in radians unless stated otherwise.

Let us first consider the phase of a signal arriving by a direct path DP, at element $c$ relative to the phase of a similar signal also arriving by a dirct path and incident upon the ground point $g$. The phase of this direct signal at $c$, relative to the phase of the signal at $g$ is given by $$\phi_c = (2\pi h \sin \theta)/\lambda \qquad (i)$$

Similarly, the phase of the direct signal at element $a$ is given by $$\phi_a = (2\pi(h + 2d)\sin \theta)/\lambda \qquad \text{(ii)}$$

and the phase of the direct signal at $b$ is given by $$\phi_b = (2\pi(h + d) \sin \theta)/\lambda = (\phi_a + 0 \ \phi_c)/2 \qquad \text{(iii)}$$

The reflected signals arrive at an angle $-\theta$ and in a similar way can be shown to have phases $-\phi_a$ at $a$, $-\phi_c$ at $c$ and $-(\phi_a + \phi_c)/2$ at $b$.

Consider now the composite signal incident at each aerial element; let the total signals at the elements be indicated by A, B, C, comprising direct components $A_1$, $B_1$, $C_1$ each of unit magnitude and reflected components $A_2$, $B_2$, $C_2$ each of magnitude $p$.

The results of vectorial combination of two or more of these three signals A, B, C, will now be investigated: as will become apparent it is convenient to consider separately the vectorial combination of the direct signal components and the reflected signal components.

Figures 2, 3:
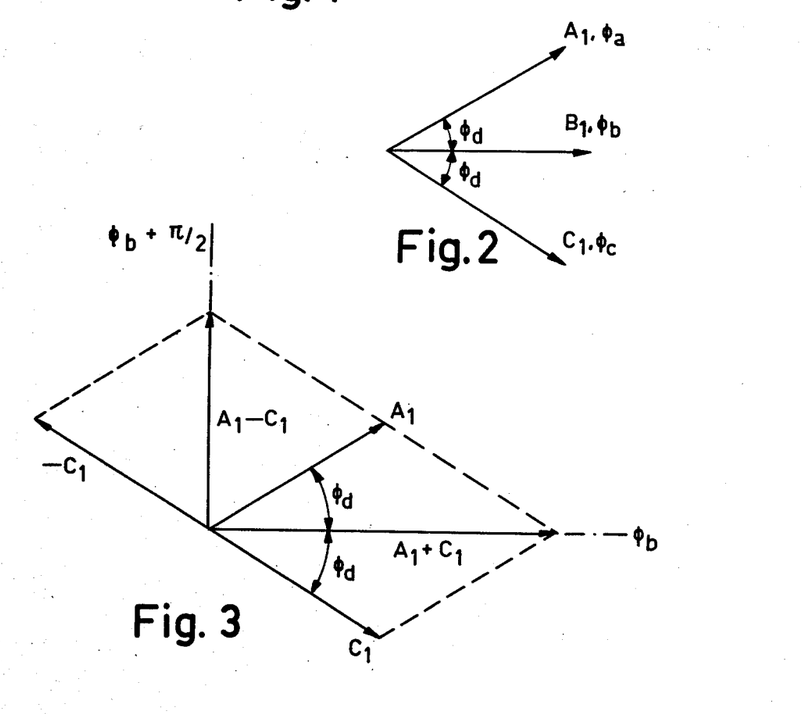
FIG. 2 is a vector diagram.
FIGS. 3, 4, 5 and 6 are further vector diagrams.

Consider first the three direct signal components $A_1, B_1, C_1$ illustrated in FIG. 2 where component $A_1$ is at an angle $\phi_a$, component $B_1$ is at an angle $\phi_b$ and component $C_1$ is at an angle $\phi_c$: if the write $\phi_d$ for the half-difference phase $(\phi_a - \phi_c)/2$ so that $$\phi_d = (\phi_a - \phi_c)/2 = (2\pi d \sin \theta)/\lambda \qquad \text{(iv)}$$

then the vector $B_1$ will make an angle $\phi_d$ with each of the other two vectors. Consider now the effect of adding the vectors $A_1$ and $C_1$ together vectorially as illustrated in FIG. 3: as can be seen from FIG. 3, the resultant of this addition of $A_1$ and $C_1$ will be a vector having the same direction as the vector $B_1$; we thus may write in modulus, argument, form the identities $$\left. \begin{array}{l} A_1 + C_1 = (2 \cos \phi_d), \phi_b \\ B_1 = 1, \phi_b \end{array} \right\} \qquad \text{(v)}$$

Figure 4:
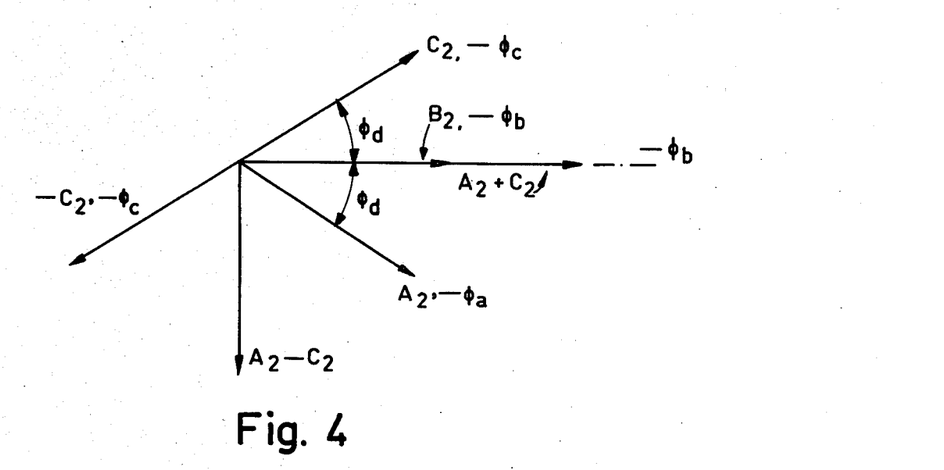

The vector diagram of FIG. 4 is similar to that of FIG. 3 but concerned with the reflected signal. Here, vectors $A_2$ and $C_2$ are equally disposed, each at an angle $\phi_d$, about vector $B_2$ which however is here at an angle $-\phi_b$ instead of $+\phi_b$ and it can be seen that the addition of vectors $A_2$ and $C_2$ yields a resultant vector in the same direction as vector $B_2$: consideration of FIG. 4 leads us to the identities $$\left. \begin{array}{l} A_2 + C_2 = (2p \cos \phi_d), -\phi_b \\ B_2 = p, -\phi_b \end{array} \right\} \qquad \text{(vi)}$$

Figure 5:
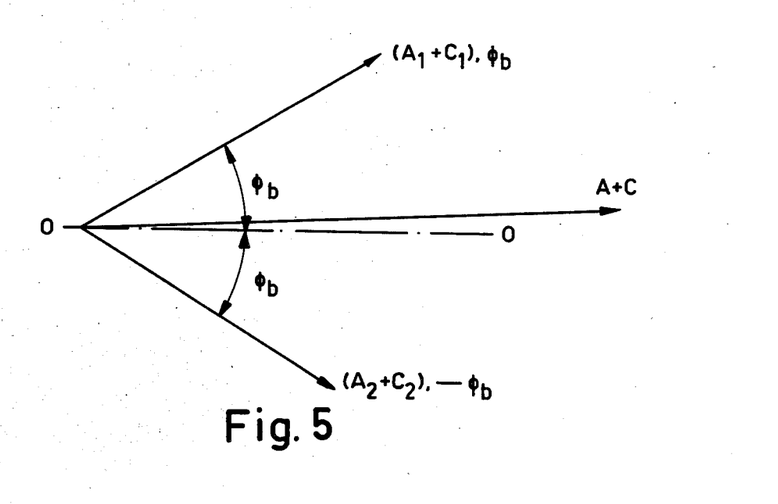

Consider now the effect of adding the direct and indirect signals at aerial elements $a$ and $c$ together. As shown in FIG. 5, we can draw a vector indicating the direct components $(A_1 + C_1)$ at an angle $\phi_b$ relative to a zero datum and a vector indicating the indirect components $(A_2 + C_2)$ at an angle $-\phi_b$ to that datum. This yields the resultant vector $(A + C)$, the modulus of which can be expressed by the identity $$|A + C| = 2|\cos \phi_d| \cdot (1 + p^2 + 2p\cos 2\phi_b)^{1/2} \qquad \text{(vii)}$$

Similarly $$|B| = (1 + p^2 + 2p \cos 2 \phi_b)^{1/2} \qquad \text{(viii)}$$

and if we write $$(1 + p^2 + 2p \cos 2 \phi_b)^{1/2} = f_1(p) \qquad \text{(ix)}$$

we can derive expressions for various linear vector combinations A, B and C, for example $$\left. \begin{array}{l} |A + B + C| = |\ 1 + 2 \cos \phi_d\ | \cdot f_1(p) \\ |A - B + C| = |\ 1 - 2 \cos \phi_d\ | \cdot f_1(p) \\ |A + 2B + C| = 2|\ 1 + \cos \phi_d\ | \cdot f_1(p) \\ |A - 2B + C| = 2|\ 1 - \cos \phi_d\ | \cdot f_1(p) \end{array} \right\} \qquad \text{(x)}$$

and so on.

Inspection of expressions (vii) to (x) shows that each of these quantities has a factor $f_1(p)$ and that if we divide one expression by any other then this factor will disappear and we will be left with a quotient expression which is a function of $\phi_d$, and hence is a function of $\theta$, but is quite independent of $p$. The most convenient divisor probably is $|B|$ since this is of course equal to $f_1(p)$ so that we may write for example $$\frac{|A + C|}{|B|} = 2 |\cos \phi_d| \qquad \text{(xi)}$$

Let us now consider the aerial elements $x$ and $y$ shown in FIG. 1: proceeding in a similar manner to that outlined above in respect of the elements $a$ and $c$ we can derive the equation:

$$|X + Y| = 2 |\cos \phi_e| f_1(p) \qquad \text{(xii)}$$

where $\phi_e$ represents the half-difference phase $(\phi_x - \phi_y)/2$. From this we can derive a further quotient $$\frac{|X + Y|}{|A + C|} = \frac{|\cos \phi_e|}{|\cos \phi_d|} \qquad \text{(xiii)}$$

from which we can see that the principle behind the invention can be applied using either a pair of aerials evenly spaced about a central aerial or two pairs of aerials of different spacings evenly spaced about a centre point at which there is no aerial: in other words, provided that the array consists of at least three aerials symmetrically disposed relative to a centre point, then the average phase of any symmetrical pair of aerials can be related to the phase at that centre point even if the centre point itself has no aerial element associated with it.

As is well known, the relative phase $\phi_r$ between two elements in an interferometer can be expressed as $$(2\pi d \sin \theta)/\lambda \qquad \text{(xiv)}$$

and if we adopt the spaced relationship indicated in FIG. 1, where the elements $a$ and $c$ are $2d$ apart and the elements $x$ and $y$ are $2nd$ apart then we may rewrite expression (xiii) in the form $$\frac{|X + Y|}{|A + C|} = \frac{|\cos n\phi_d|}{|\cos \phi_d|} \qquad \text{(xv)}$$

It is of course interesting to note that in this process of algebra the final expressions are also independent of height $h$.

Figure 6:
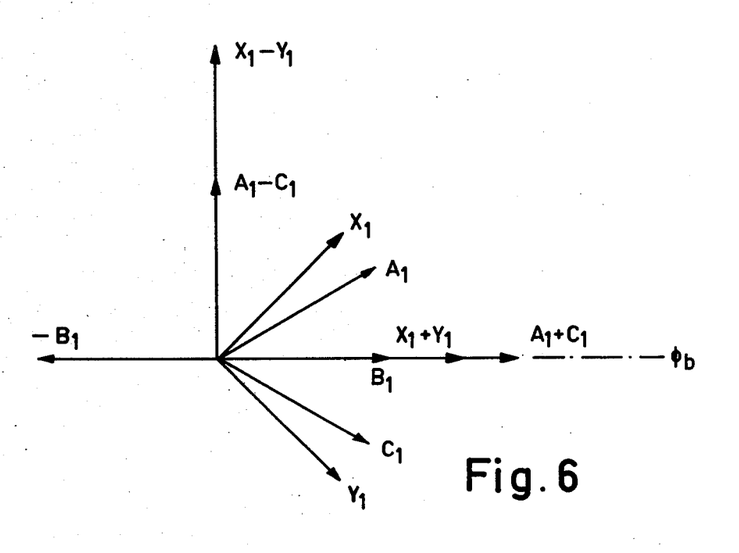

Having now considered the effect of addition of the phase-information signals derived from pairs of elements, it is convenient for the sake of completeness to consider the effect of deriving a difference signal between the elements of a pair instead of a sum signal. Referring again to FIG. 3 this illustrates the vector representing $-C_1$ and the resultant difference vector $(A_1 - C_1)$; it is of course at an angle $(\phi_b + \pi/2)$ orthogonal to the sum vector and to the vector $B_1$. FIG. 6 shows a typical relationship between these sum and difference vectors and their relationship to the vector $B_1$, $\phi_b$.

Similarly, in FIG. 4 we can see the difference vector $-C_2$ and the resultant $(A_2 - C_2)$ again orthogonal to the sum vector and at an angle $-(\phi_b + \pi/2)$. These processes yield identities of a similar nature to those of expressions (v) and (vi) above and having the form $$A_1 - c_1 = (2 \sin \phi_d), (\phi_b + \pi/2) \qquad \text{(xvi)}$$

$$A_2 - C_2 = (2p.\sin \phi_d), -(\phi_b + \pi/2)$$

These direct-signal and indirect-signal differences can now be added together, in a similar manner to that already discussed above with reference to FIG. 5, to yield a resultant vector $(A - C)$, the modulus of which can be expressed by the identity $$|A - C| = 2 |\sin \phi_d (1 + p^2 - 2 p \cos 2 \phi_b)^{1/2} \qquad \text{(xvii)}$$

which for convenience we can express as $$|A - C| = 2 |\sin \phi_d| f_2(p) \qquad \text{(xviii)}$$

where, of course, $$f_2(p) = (1 + p^2 - 2 p \cos \phi_b)^{1/2} \qquad \text{(xix)}$$

Similarly, we can obtain from the elements $x$ and $y$ the expression $$|X - Y| = 2 |\sin \phi_e| f_2(p) \qquad \text{(xx)}$$

from which we may derive, compare expression (xiv), $$\frac{|X - Y|}{|A - C|} = \frac{|\sin n \phi_d|}{|\sin \phi_d|} \qquad \text{(xxi)}$$

It is interesting to note that if $n$ equals 2, that is to say the elements $x$, $a$, $b$, $c$ and $y$ are equally spaced, then this last expression reduces to $$\frac{|X - Y|}{|A - C|} = 2|\cos \phi_d| \qquad \text{(xxii)}$$

Summarising the argument thus far it is proposed to solve the problem mentioned in the opening paragraphs of this specification by producing, from an aerial array having the characteristics discussed, a quotient signal which is a function of $(d \sin \theta)$ bus is independent of reflection factor $p$ and height $h$: this quotient signal is obtained by dividing a first auxiliary signal proportional to a function of $(d \sin \theta)$ multiplied by a function $f(p)$ by a second auxiliary signal proportional to a different function of $(d \sin \theta)$ multiplied by the same function $f(p)$.

As with all sector-definition systems the object is not to measure the angle of the received radiation but rather to indicate whether if falls inside or outside a given sector in order to increase the coverage of a main interferometer. The main interferometer itself is used to indicate the range of angles within which are sectors each froming part of that range.

By way of example, consider the angular extent of sectors which can be defined by some of the expressions derived above, assuming that we are interested in a sector of which one limit is horizontal, that is to say $\theta = $ zero.

Consider the expression $$\frac{|A + 2B + C|}{|2B|} = |1 + \cos \phi_d| \qquad \text{(xxiii)}$$

Figure 12:
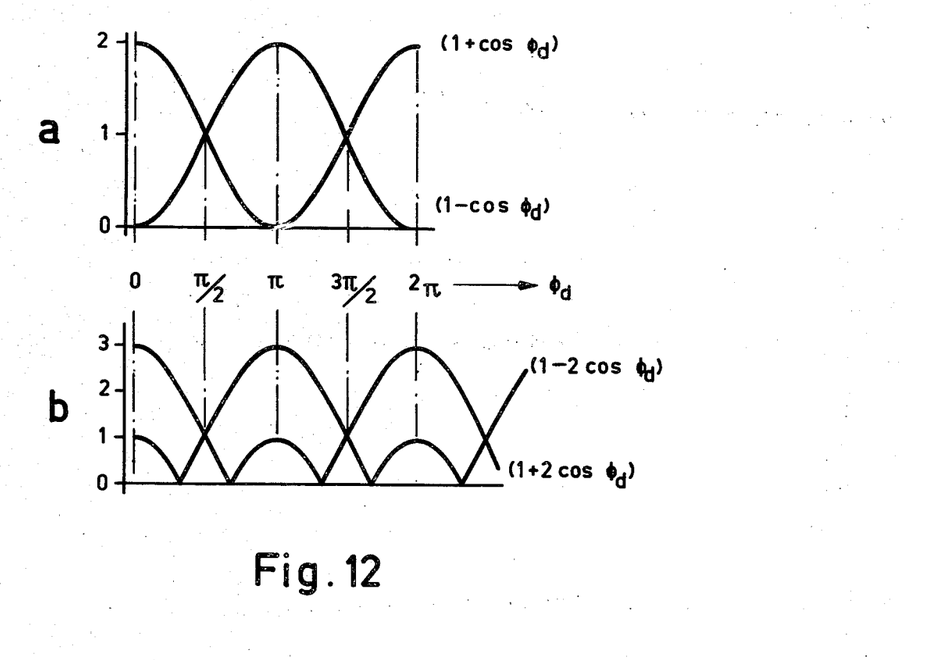
FIG. 12 illustrates the graphic forms of some mathematical functions.

The graph of this expression is illustrated at FIG. 12(a) from which it can be seen that between the limits of $\phi_d = 0$ and $\phi_d = 3\pi/2$ one can define unambiguously a sector from $\phi_d = 0$ to $\pi/2$ where $|1 + \cos \phi_d|$ is greater than unity and a sector from $\phi_d = \pi/2$ to $3 \pi/2$ where $|1 + \cos \phi_d|$ is less than unity. If $\phi_d$ exceeds $3 \pi/2$ the indication becomes ambiguous.

Another, similar, expression is $$\frac{|A - 2B + C|}{|2B|} = |1 - \cos \phi_d| \qquad \text{(xxiv)}$$

also illustrated in FIG. 12(a): again, the graph is unambiguous up to $\phi_d = 3 \pi/2$ and convenient sectors are 0 to $\pi/2$ where $$|1 - \cos \phi_d|$$

is less than unity and $\pi/2$ to $3 \pi/2$ where it is greater than unity. It is interesting to note that this expression gives an amplitude null at the horizontal, that is $\theta = $ zero, which can be advantageous to minimize the effect of scattering.

Another pair of similar expressions is $$\frac{|A + B + C|}{|B|} = |1 + 2 \cos \phi_d| \qquad \text{(xxv)}$$

and $$\frac{|A - B + C|}{|B|} = |1 - 2 \cos \phi_d| \qquad \text{(xxvi)}$$

the graphs of which are drawn at FIG. 12(b). For both expressions we may define two sectors; for example we may define one in which the expression exceeds unity and another in which it does not, the sectors in such case again extending from $\phi_d = 0$ to $\pi/2$ and from $\phi_d = \pi/2$ to $3 \pi/2$.

Of course, with all these expressions the boundaries of the sectors depend to a certain extent on the choice of the value of the expression at the common boundary. For example, consider expression (xxiii) and let the boundaries be those at which the expression equals 0.5: then the sectors extend from 0 to $2 \pi/3$ and from $2 \pi/3$ to $4 \pi/3$ above which last value of $\phi_d$ ambiguity occurs.

The simplest case is that of expression (xi) but this can become ambiguous at an angle greater than $\phi_d = \pi/2$ and therefore its usefulness is less than that of cases such as those defined by expressions (xxiii) to (xxvi) where the unambiguity range is greater.

As a guide to the relationship between elevation angle $\theta$ and the half-difference phase $\phi_d$ see expressions (i) to (iv), above, if the wavelength $\lambda$ is 6 cm and the element spacing $d$ is 18 cm as in the embodiment described below, then in FIG. 12 a phase $\phi_d$ of $\pi/2$, which as pointed out above forms a convenient boundary for systems using expressions (xxiii) to (xxvi), corresponds to an elevation angle $\theta$ of 4.7 degrees whilst $\phi_d = 3 \pi/2$ corresponds to $\theta = 9.6$ degrees.

Two arrangements for carrying out the method of the invention will now be described.

Figure 7:
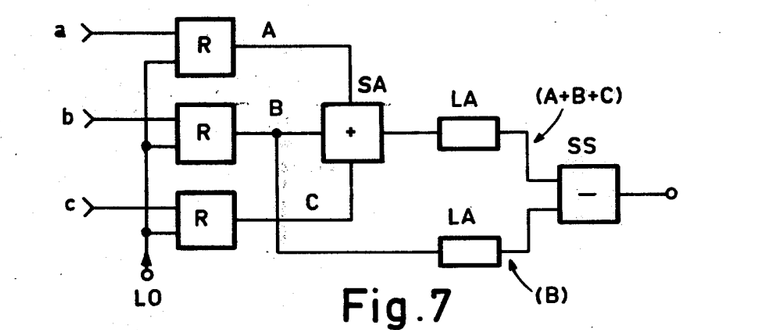
FIG. 7 is a block diagram illustrating an embodiment.

Referring to FIG. 7 this illustrates an experimental arrangement which provides an output in the form indicated by expressions (xxv). The aerial array comprises three horns $a$, $b$ and $c$, aligned in a vertical axis with the centre horn $b$ a distance of 18 cm from each of the two outer horns, $a$ and $c$. Here, it is convenient once more to refer to FIG. 1 and to allocate the distance 18 cm to the distance $d$ in that Figure. The frequency of operation is 5 GHz giving a wavelength $\lambda$ of 6 cm.

Figure 8:
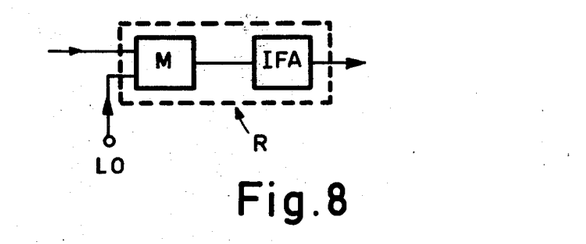
FIG. 8 illustrates the arrangement of a receiver.

Each horn aerial feeds a separate receiver R and local oscillator signals LO are also supplied to each receiver with identical phase at each receiver input so as to preserve the phase information: as shown in FIG. 8, each receiver R comprises a mixer stage M receiving the signal from the horn aerial and from the local oscillator, followed by an intermediate-frequency amplifier IFA from which is obtained an output at the intermediate frequency of 12 MHz: this output of course still maintains the original phase information of the signal incident upon the respective horn.

Referring again to FIG. 7, the intermediate-frequency outputs from the receivers associated with aerials $a$, $b$ and $c$ are added in an adding stage SA and the sum signal, still at the intermediate frequency, is then passed to a logarithmic amplifier LA. The output signal from the receiver associated with the horn $b$ is also passed to a logarithmic amplifier LA giving at the outputs of each of these two amplifiers voltage signals representing $|A+B+C|$ and $|B|$ respectively, and these two signals are compared in a subtractor stage SS so as to give an output of the form indicated in expression (xxv). In FIG. 7 the three outputs from the receivers A, B and C are indicated as are also the forms of the outputs from the two logarithmic amplifiers.

Figure 9:
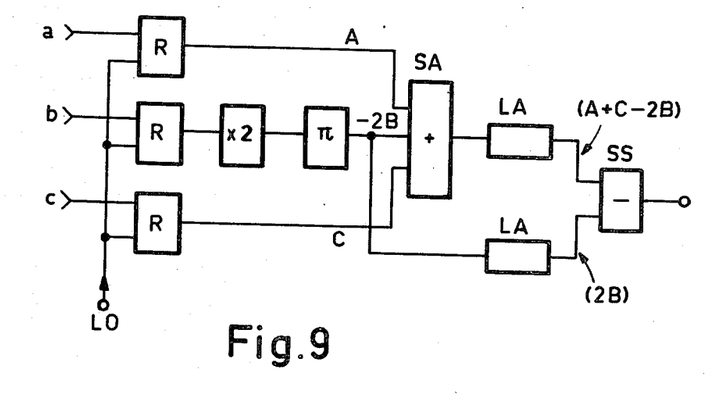
FIG. 9 is a block diagram illustrating a second embodiment.

FIG. 9 illustrates an arrangement in which the output is of the form indicated by expression (xxiv); bearing in mind the description relating to FIG. 7, the mode of operation of the arrangement of FIG. 9 will be obvious. It can be seen however that in order to realise a signal representing $-2B$, the signal B is doubled and passed through a device which effects a phase change of $\pi$ radians, that is to say 180 degrees, so as to have the effect of multiplying by $-1$; it will be remembered that at this point the signal is at the intermediate frequency.

Figure 10:
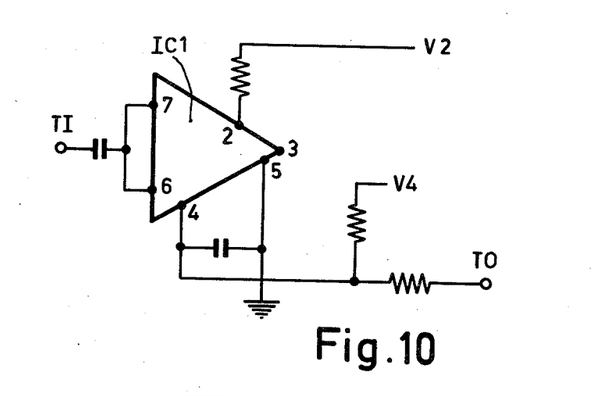
FIGS. 10 and 11 illustrate amplifiers.

FIG. 10 shows a form of logarithmic amplifier which was found suitable for use as the amplifiers LA in FIGS. 7 and 9. It is based upon a logarithmic amplifier made by Plessey, type SL 521B and provides from a radio-frequency input a direct-voltage output which is a logarithmic function of the detected amplitude of the input signal. As shown in FIG. 10, the input signal is applied from an input terminal TI through a 0.1 $\mu$F capacitor to pins 6 and 7 of the integrated circuit IC 1. Pin 2 is returned through a resistor of 10 Ohms to a positive voltage line V2 of 6 volts whilst pin 5 is connected directly to a common negative line here indicated as earth. The D.V. output at terminal TO is derived through a 47 Ohm resistor from pin 4 of the integrated circuit, this pin also being returned through a resistor of 680 Ohms to a positive voltage line V4 of 5 volts. An alternating current by-pass capacitor of some 220 pF is connected between pins 4 and 5.

Figure 11:
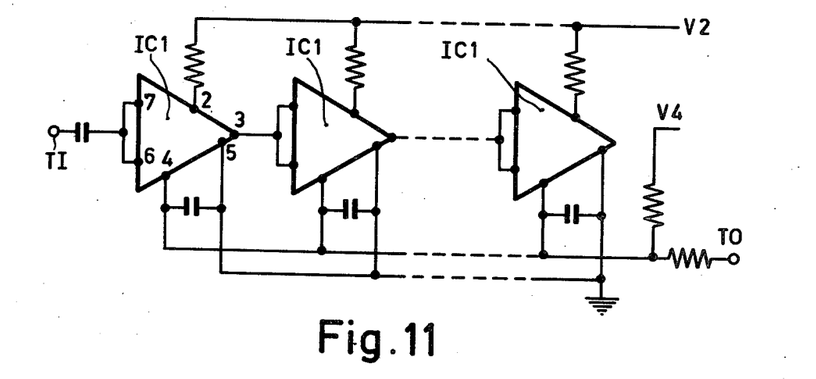

Referring now to FIG. 11 this shows an improved version of logarithmic amplifier which has been found to give considerably greater dynamic range. In FIG. 11 the resistors and capacitors have the same values as corresponding components in FIG. 10 and each of the integrated circuits, IC 1 is of the same type as that illustrated in FIG. 10, that is to say type SL 521B. As can be seen in FIG. 11 the integrated circuits are connected in cascade by applying the output at pin 3 of each integrated circuit to the common input pins 6 and 7 of the next following circuit: of course, in the final integrated circuit of the chain no output is taken from pin 3, compare FIG. 10. The outputs from each of the circuits in the chain is taken from the common pins 4 and again applied through a 47 Ohm resistor to the output terminal TO, these pins 4 being returned, as before, to a positive voltage line V4 of 5 volts.

In each of the arrangements of FIG. 10 and FIG. 11 there is thus provided at an output terminal TO a D.V. signal of which the amplitude is a lograrithmic function of the amplitude of the radio-frequency signals applied to an input terminal TI. Where, as will usually be the case, the signals incident upon the aerial array are in the form of pulses, and therefore the intermediate frequency signal at terminal TI of FIG. 10 or FIG. 11 is also in the form of pulses, then, obviously the output at terminal TO will be in the form of uni-directional pulses.

The adding stage SA in FIG. 7 can suitably merely take the form of a simple resistor adding network and may, if desired, also incorporate a linear amplifier so as to provide a suitable level of input signal to each of the logarithmic amplifiers LA.

Figure 13:
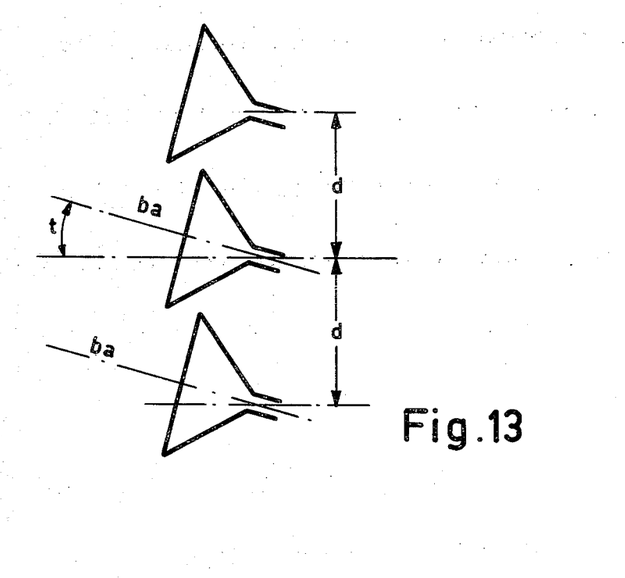
FIG. 13 illustrates a suitable aerial array.

FIG. 13 shows diagrammatically an aerial arrangement used with the embodiments illustrated in FIGS. 7 and 9: the arrangement is in the main self-explanatory, and consists of three horns set with their longitudinal axes $ba$ parallel and inclined to the horizontal by an angle $t$ of some 11 degrees. The arrangement is substantially identical to that disclosed in the above-mentioned U.K. Patent Specification 1,337,099.

What is claimed is:

1. Method of defining a vertical sector by means of radio interferometry in which from each aerial of an array of at least three aerials arranged in a vertical straight line as information signal is derived which depends both on the elevation angle $\theta$ at which a radio wave from a distant source is incident upon the array and on the ground reflection coefficient p; comprising the steps of deriving a first and a second auxiliary signal, respectively, from the information signals from a first group of aerials which comprises at least two aerials of the said array and from the information signals from a second group of aerials symmetrically disposed relative to the centre point of the first group and comprises at least one aerial of the said array, the amplitude of each auxiliary signal being proportional to a function $f(p)$ of $p$, which is equal for both groups of aerials, multiplied by a function $f_1(\theta)$ and $f_2(\theta)$ respectively, which is different for the two groups of aerials and depends upon $\theta$ and not upon $p$, and dividing the modulus of one auxiliary signal by the modulus of the other auxiliary signal to produce a quotient signal which is dependent upon $\theta$ but is independent of $p$.

2. Method as claimed in claim 1, wherein the step of dividing one auxiliary signal by the other is accomplished by amplifying each signal in a logarithmic amplifier and then producing in a difference stage a resultant difference signal which represents the logarithm of the quotient of the two auxiliary signals.

3. System for defining a vertical sector by means of radiointerferometry, comprising an array of at least three aerials arranged in a vertical straight line, radio receiver means to obtain from each aerial an information signal which contains both the amplitude information and the phase information of the received signal and is a function of the elevation angle $\theta$ and of the ground reflection coefficient $p$, first means for forming a linear vector combination of at least two information signals obtained from a first group of aerials which comprises at least two aerials from the said array to provide a first auxiliary signal, second means to derive from information signals obtained from a second group of aerials which is symmetrically disposed relative to the centre point of the first group and comprises at least one aerial of the said array to provide a second auxiliary signal, and a dividing device to divide one auxiliary signal by the other to provide a quotient signal which is a function of $\theta$ but is independent of $p$.

4. System as claimed in claim 3, wherein the said first and second means each comprise a logarithmic amplifier whilst the dividing device comprises a difference stage for forming the difference between the output signals from the said amplifiers to provide a quotient signal which is proportional to the logarithm of the ratio of the moduli of the two input signals.

* * * * *

UNITED STATES PATENT AND TRADEMARK OFFICE
CERTIFICATE OF CORRECTION

PATENT NO. : 3,971,027
DATED : July 20, 1976
INVENTOR(S) : ROBERT N. ALCOCK ET AL It is certified that error appears in the above-identified patent and that said Letters Patent are hereby corrected as shown below:

Column 5, line 52, change "bus" to --but--;

line 65, change "froming" to --forming--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*